Figure 1:
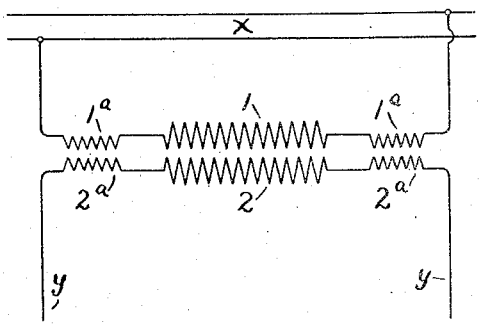

M. O. TROY.
PROTECTING HIGH VOLTAGE TRANSFORMERS.
APPLICATION FILED NOV. 14, 1908.

1,105,385.

Patented July 28, 1914.

WITNESSES:
Benjamin B. Hill
Margaret E. Hooley

INVENTOR
MATTHEW O. TROY.
BY
ATT'Y

UNITED STATES PATENT OFFICE.

MATTHEW O. TROY, OF SCHENECTADY, NEW YORK, ASSIGNOR TO GENERAL ELECTRIC COMPANY, A CORPORATION OF NEW YORK.

PROTECTING HIGH-VOLTAGE TRANSFORMERS.

1,105,385.  Specification of Letters Patent.  Patented July 28, 1914.

Application filed November 14, 1908. Serial No. 462,844.

*To all whom it may concern:*

Be it known that I, MATTHEW O. TROY, a citizen of the United States, residing at Schenectady, county of Schenectady, State of New York, have invented certain new and useful Improvements in Protecting High-Voltage Transformers, of which the following is a specification.

This invention relates to stationary electric transformers for converting currents of one potential to those of a higher or lower voltage as may be desired.

In operating step-down transformers on high tension transmission lines the winding is exposed to great danger of injury by reason of surges of abnormally high potential which may come over the line, arising from atmospheric lightning, accidental grounds, improper manipulation of switches, or what not. The end turns of the winding are those which suffer most, being frequently short-circuited and burned out before the potential can distribute itself over the entire coil.

My invention aims to prevent this trouble by placing a small auxiliary transformer in series with the main transformer and between it and the line to act as a buffer, so to speak, and take the concentration of potential which develops in the end turns. The damage, if any, is thus confined to the auxiliary transformer which can be readily replaced or repaired. This small transformer may embody special protective features, if desired. It has its primary winding connected in series with the primary of the main transformer and its secondary in series with the secondary of the main transformer. So long as it remains in commission, it performs part of the useful work of transformation, but if, for any reason, its turns become short-circuited either on primary or secondary it can remain in service without changing the ratio of transformation of the system, the main transformer being then operated at a higher density, as if it were connected directly to the line.

The efficiency of the auxiliary transformer is of no great importance because of its small capacity. It can, therefore, be designed to give the maximum amount of protection irrespective of efficiency. It can, for instance, be wound for higher reactance, thereby performing the functions of reactive coils. Or, it can have an edgewise winding of bare copper with mica insulation between the turns. This gives a reactance high enough to cause an arcing over of current from turn to turn, thereby quickly distributing the strain. Or the turns can be spaced apart with air insulation; or immersed in oil; or taps can be brought out from the turns and spark gaps arranged between said taps, so as to dissipate the potential when it tends to pile up on the end turns, and reduce the strain to a safe limit before it reaches the main transformer.

Figure 2:
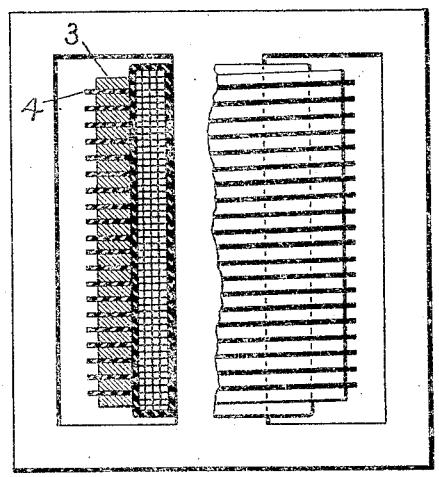
Figure 3:
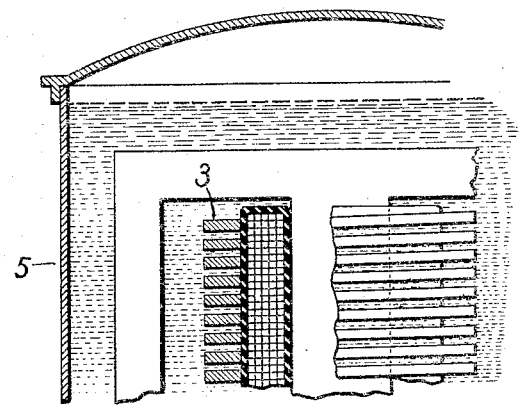
Figure 5:
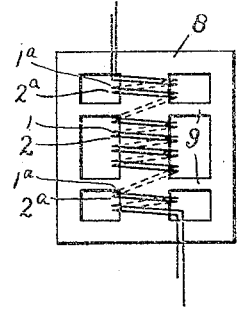
Figure 4:
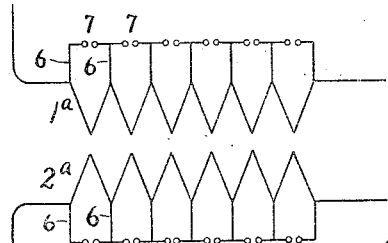

In the accompanying drawing, Figure 1 is a diagram illustrating my invention; Fig. 2 is a sectional elevation of an auxiliary transformer; Fig. 3 shows a portion of a transformer embodying the invention; Fig. 4 is a diagram showing a further modification; and Fig. 5 shows another modification.

Referring first to Fig. 1, the primary winding 1 of the main transformer is in series with the primary windings 1$^a$ of the auxiliary transformers which are located at each end of the main transformer between it and the line $x$. The secondary winding 2 of the main transformer is also in series with the secondaries 2$^a$ of the auxiliaries, which are interposed between the main winding and the load circuit $y$.

The construction of an auxiliary may vary considerably. Thus in Fig. 2 the primary 3 is an edgewise wound strip of bare copper, with interposed insulation 4, such as mica. The exposed edges of the winding permit an arcing or flashing of abnormal currents over the mica from turn to turn of the copper, until a safe distribution of the dangerous potential has been reached.

If desired, the mica may be omitted, and air insulation alone depended on, or such a coil may be immersed in an oil tank 5, as shown in Fig. 3. Or, both the windings of the auxiliary transformer may be provided with regularly arranged taps 6 having spark-gaps 7 connected between adjacent taps, so that the excess of potential may jump the gaps and be dissipated. The spark-gaps will extinguish any dynamic arc which may attempt to follow the discharge of high potential.

Fig. 5 shows one magnetic circuit for the main and auxiliary transformers, the core 8 being common to both sets of windings 1$^a$ 1 1ª and 2ª 2 2ª with magnetic bridges 9 between the main and auxiliary windings. This makes a compact and rigid structure.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new, and desire to secure by Letters Patent of the United States, is,—

1. In combination, a line carrying electric current, a main transformer connected thereto, and a small auxiliary transformer permanently included in each line connection in series between the line and the corresponding transformer terminal and adapted to take the concentration of potential which develops in the end turns.

2. In combination, line conductors carrying electric current, a main transformer connected thereto, and a small auxiliary transformer permanently connected to the main transformer at each end thereof between it and the corresponding line conductor and adapted to take the concentration of potential which develops in the end turns.

3. In combination, line conductors carrying electric current, a main transformer connected thereto, a small auxiliary transformer permanently connected to the main transformer at each end thereof between it and the corresponding line conductor and adapted to take the concentration of potential which develops in the end turns, and a common magnetic circuit for the main and auxiliary transformers.

In witness whereof, I have hereunto set my hand this 12th day of November, 1908.

MATTHEW O. TROY.

Witnesses:
 BENJAMIN B. HULL,
 HELEN ORFORD.

---

Copies of this patent may be obtained for five cents each, by addressing the "Commissioner of Patents, Washington, D. C."